United States Patent
Mital et al.

(10) Patent No.: US 9,069,557 B2
(45) Date of Patent: Jun. 30, 2015

(54) BUSINESS INTELLIGENCE DOCUMENT

(75) Inventors: Vijay Mital, Redmond, WA (US); Darryl Rubin, Redmond, WA (US); David George Green, London (GB); Gary Shon Katzenberger, Redmond, WA (US); Olivier Colle, Redmond, WA (US); Suraj Poozhiyil, Redmond, WA (US)

(73) Assignee: Microsoft Technology Licensing, LLP, Redmond, WA (US)

( * ) Notice: Subject to any disclaimer, the term of this patent is extended or adjusted under 35 U.S.C. 154(b) by 443 days.

(21) Appl. No.: 12/971,462

(22) Filed: Dec. 17, 2010

(65) Prior Publication Data

US 2012/0159465 A1  Jun. 21, 2012

(51) Int. Cl.
G06F 9/44 (2006.01)
G06F 9/45 (2006.01)
G06F 7/00 (2006.01)

(52) U.S. Cl.
CPC .............. *G06F 8/34* (2013.01); *G06F 9/4436* (2013.01)

(58) Field of Classification Search
None
See application file for complete search history.

(56) References Cited

U.S. PATENT DOCUMENTS

| | | | |
|---|---|---|---|
| 4,633,430 A | 12/1986 | Cooper | |
| 5,669,007 A | 9/1997 | Tateishi | |
| 5,867,714 A * | 2/1999 | Todd et al. | 717/172 |
| 6,691,100 B1 * | 2/2004 | Alavi et al. | 1/1 |
| 6,865,720 B1 | 3/2005 | Otani et al. | |
| 6,931,589 B2 | 8/2005 | Baltsan et al. | |
| 7,028,306 B2 | 4/2006 | Boloker et al. | |
| 7,263,663 B2 | 8/2007 | Ballard et al. | |
| 7,263,694 B2 * | 8/2007 | Clewis et al. | 717/156 |
| 7,315,861 B2 | 1/2008 | Seibel et al. | |
| 7,343,585 B1 | 3/2008 | Lau et al. | |
| 7,349,947 B1 * | 3/2008 | Slage et al. | 709/217 |
| 7,440,902 B2 | 10/2008 | Greenstein et al. | |
| 7,506,243 B2 | 3/2009 | Kotler et al. | |
| 7,603,620 B2 | 10/2009 | Erol et al. | |
| 7,752,314 B2 | 7/2010 | Trevor et al. | |
| 7,752,536 B2 | 7/2010 | Megiddo et al. | |

(Continued)

OTHER PUBLICATIONS

Hilary Cheng et al. "An ontology-based business intelligence application in a financial knowledge management system", [Online], 2008, pp. 3614-3622, [Retrieved from Internet on Jan. 31, 2015], <http://ac.els-cdn.com/S0957417408001887/1-s2.0-S0957417408001887-main.pdf>.*

(Continued)

*Primary Examiner* — Thuy Dao
*Assistant Examiner* — Ziaul A Chowdhury
(74) *Attorney, Agent, or Firm* — Kevin Sullivan; Kate Drakos; Mickey Minhas (57) ABSTRACT

A business intelligence (BI) document preserves references to identities and formats of remote data sources and allows a local computing device to offload analytical operations to remote data sources. The BI document specifies a graph of entities connected by directed edges from the output of one entity to an input of another entity. An entity, for example, can represent without limitation a data structure, an external data source, a control element, an external event source, a visualization, or an update service. The entities of a BI document at a local computing device can reference data at an original data source—rather than extracting data from the original data source to a preferred local datastore. An entity of the BI document can direct a remote data source to execute transformations on the remote data before returning a solution to the local computing device.

18 Claims, 7 Drawing Sheets

(56) References Cited

U.S. PATENT DOCUMENTS

| | | | |
|---|---|---|---|
| 7,802,230 B1 | 9/2010 | Mendicino et al. | |
| 7,870,545 B2* | 1/2011 | Saha et al. | 717/159 |
| 7,900,111 B1 | 3/2011 | Kim et al. | |
| 7,908,186 B2 | 3/2011 | Gabelmann et al. | |
| 7,941,791 B2* | 5/2011 | Wang et al. | 717/140 |
| 8,032,875 B2* | 10/2011 | Kosche et al. | 717/158 |
| 8,117,606 B2* | 2/2012 | Chakrabarti et al. | 717/156 |
| 8,135,655 B2 | 3/2012 | Oaten et al. | |
| 8,201,160 B2* | 6/2012 | Hauser | 717/156 |
| 8,332,772 B2 | 12/2012 | Janzen et al. | |
| 8,429,630 B2* | 4/2013 | Nickolov et al. | 717/148 |
| 8,473,473 B2* | 6/2013 | Wang et al. | 707/705 |
| 8,589,172 B2 | 11/2013 | Alonso et al. | |
| 8,635,211 B2 | 1/2014 | Jiang et al. | |
| 8,713,058 B2* | 4/2014 | Nagoski et al. | 707/791 |
| 2001/0047372 A1 | 11/2001 | Gorelik et al. | |
| 2002/0065673 A1* | 5/2002 | Rooke | 705/1 |
| 2002/0066782 A1* | 6/2002 | Swaminathan et al. | 235/375 |
| 2002/0091609 A1* | 7/2002 | Markowski | 705/36 |
| 2002/0169658 A1 | 11/2002 | Adler | |
| 2002/0191199 A1 | 12/2002 | Imada et al. | |
| 2003/0041104 A1 | 2/2003 | Wingard et al. | |
| 2003/0144868 A1 | 7/2003 | MacIntyre et al. | |
| 2004/0015481 A1 | 1/2004 | Zinda | |
| 2004/0098358 A1 | 5/2004 | Roediger | |
| 2004/0153992 A1 | 8/2004 | Molina-Moreno et al. | |
| 2004/0162842 A1 | 8/2004 | Ono et al. | |
| 2004/0181519 A1 | 9/2004 | Anwar | |
| 2005/0004911 A1 | 1/2005 | Goldberg et al. | |
| 2005/0043961 A1* | 2/2005 | Torres et al. | 705/1 |
| 2005/0187809 A1 | 8/2005 | Falkenhainer | |
| 2005/0231392 A1* | 10/2005 | Meehan et al. | 340/995.1 |
| 2006/0074882 A1 | 4/2006 | Scherer et al. | |
| 2006/0080400 A1 | 4/2006 | Guha | |
| 2007/0038657 A1 | 2/2007 | Denton et al. | |
| 2007/0046664 A1 | 3/2007 | Raspl et al. | |
| 2007/0061711 A1 | 3/2007 | Bodin et al. | |
| 2007/0112714 A1 | 5/2007 | Fairweather | |
| 2007/0124285 A1 | 5/2007 | Wright et al. | |
| 2007/0136326 A1* | 6/2007 | McClement et al. | 707/100 |
| 2007/0179941 A1* | 8/2007 | Huang et al. | 707/4 |
| 2007/0185746 A1 | 8/2007 | Chieu et al. | |
| 2007/0250764 A1 | 10/2007 | Jiang | |
| 2007/0265995 A1 | 11/2007 | Remington et al. | |
| 2007/0294614 A1 | 12/2007 | Jacquin et al. | |
| 2008/0040346 A1 | 2/2008 | Aggarwal et al. | |
| 2008/0058969 A1 | 3/2008 | Nixon et al. | |
| 2008/0127052 A1* | 5/2008 | Rostoker | 717/105 |
| 2008/0178083 A1 | 7/2008 | Bergman et al. | |
| 2008/0183710 A1 | 7/2008 | Serjeantson et al. | |
| 2008/0184140 A1* | 7/2008 | Koerner | 715/762 |
| 2008/0189438 A1* | 8/2008 | Zimmerer et al. | 709/246 |
| 2008/0195930 A1 | 8/2008 | Tolle | |
| 2008/0209314 A1 | 8/2008 | Sylthe et al. | |
| 2008/0215559 A1 | 9/2008 | Fontoura et al. | |
| 2008/0238925 A1* | 10/2008 | Meehan et al. | 345/441 |
| 2008/0271127 A1* | 10/2008 | Naibo et al. | 726/6 |
| 2008/0288889 A1 | 11/2008 | Hunt et al. | |
| 2008/0294996 A1 | 11/2008 | Hunt et al. | |
| 2008/0306981 A1 | 12/2008 | Jiang et al. | |
| 2008/0307334 A1 | 12/2008 | Chaudhri et al. | |
| 2008/0319829 A1 | 12/2008 | Hunt et al. | |
| 2009/0037363 A1 | 2/2009 | Kozlov et al. | |
| 2009/0049422 A1* | 2/2009 | Hage et al. | 717/104 |
| 2009/0094674 A1 | 4/2009 | Schwartz et al. | |
| 2009/0100360 A1 | 4/2009 | Janzen et al. | |
| 2009/0100407 A1 | 4/2009 | Bouillet et al. | |
| 2009/0125553 A1 | 5/2009 | Dickinson | |
| 2009/0172024 A1 | 7/2009 | Hsu et al. | |
| 2009/0172773 A1 | 7/2009 | Moore | |
| 2009/0216758 A1 | 8/2009 | Tuttle et al. | |
| 2009/0225082 A1 | 9/2009 | Hargrove et al. | |
| 2009/0254971 A1 | 10/2009 | Herz et al. | |
| 2009/0287814 A1 | 11/2009 | Robertson et al. | |
| 2009/0300544 A1 | 12/2009 | Psenka et al. | |
| 2009/0312992 A1 | 12/2009 | Chen et al. | |
| 2009/0322739 A1 | 12/2009 | Rubin et al. | |
| 2009/0327878 A1 | 12/2009 | Grandison et al. | |
| 2010/0070448 A1 | 3/2010 | Omoigui | |
| 2010/0088258 A1 | 4/2010 | Oaten et al. | |
| 2010/0100561 A1 | 4/2010 | Cooper et al. | |
| 2010/0106853 A1 | 4/2010 | Kashiyama et al. | |
| 2010/0131255 A1 | 5/2010 | Beckman et al. | |
| 2010/0179951 A1 | 7/2010 | McPhail | |
| 2010/0198697 A1 | 8/2010 | Brown et al. | |
| 2010/0205178 A1 | 8/2010 | Bush et al. | |
| 2010/0241620 A1* | 9/2010 | Manister et al. | 707/709 |
| 2010/0287459 A1 | 11/2010 | Mital et al. | |
| 2011/0029636 A1 | 2/2011 | Smyth et al. | |
| 2011/0093430 A1 | 4/2011 | B'Far et al. | |
| 2011/0131253 A1 | 6/2011 | Peukert et al. | |
| 2011/0179020 A1 | 7/2011 | Ozzie et al. | |
| 2011/0231385 A1* | 9/2011 | Wang et al. | 707/709 |
| 2011/0295795 A1* | 12/2011 | Venkatasubramanian et al. | 707/602 |
| 2011/0295853 A1 | 12/2011 | Li et al. | |
| 2012/0158643 A1 | 6/2012 | Mital et al. | |
| 2012/0158644 A1 | 6/2012 | Mital et al. | |
| 2012/0158732 A1 | 6/2012 | Mital et al. | |
| 2012/0158754 A1 | 6/2012 | Mital et al. | |
| 2012/0159312 A1 | 6/2012 | Mital et al. | |
| 2012/0159333 A1 | 6/2012 | Mital et al. | |
| 2012/0159465 A1 | 6/2012 | Mital et al. | |

OTHER PUBLICATIONS

Liyi Zhang et al., "A Feasible Enterprise Business Intelligence Design Model", [Online], 2009, pp. 182-187, [Retrived from Internet on Jan. 31, 2015], <http://ieeexplore.ieee.org/stamp/stamp.jsp?tp=&arnumber=5280009>.*

Zhang Jing et al., "Improvement Design on the Data Structure of Business Intelligence", [Online], 2011, pp. 313-321, [Retrieved from Internet on Jan. 31, 2015], <http://download.springer.com/static/pdf/174/chp%253A10.1007%252F978-3-642-25538-0_46.pdf>.*

Zhijun Ren, "Practicing for Business Intelligence Application with SQL Server 2008", [Online], 2010, pp. 1499-1503, [Retrieved from Internet on Jan. 31, 2015], <http://scholar.google.com/scholar_url?url=http%3A%2F%2Fwww.scientific.net%2FAMM.20-23.1499.pdf>.*

"Document Processing System"—Published Date: Nov. 16, 2007; http://www.wolfram.com/products/mathematica/analysis/content/DocumentProcessingSystems.html.

"How to Customize Ubuntu into your own custom distribution," Retrieved at <<http://www.linuxquestions.org/questions/ubuntu-63/how-to-customize-ubuntu-into-your-own-custom-distribution-663412/>>, Aug. 17, 2008, 10 pages.

"Introduction to the XML Pipeline Definition Language (XPL)"—Retrieved Date: Sep. 15, 2010; http://www.orbeon.com/orbeon/doc/reference-xpl-pipelines.

"LeoStatistic—building histogram, curve fit, multivariate regression, data modeling software," Retrieved at <<http://www.leokrut.com/leostatistic.html>> Retrieved Date Sep. 21, 2010, pp. 1-6.

"Optimizing forms processing"—Retrieved Date: Sep. 15, 2010; http://www.movetonow.com/content/optimizing_forms_processing.

"Publishing applications to market place," Retrieved at <<https://help.creator.zoho.com/Publishing-applications-to-market-place.html>>, Retrieved Date Nov. 26, 2010, pp. 1-5.

"Square your search results with Google Squared," Retrieved at <<http://googleblog.blogspot.com/2009/06/square-your-search-results-with-google.html>>, Jun. 2009, pp. 1-4.

"User Customization," Retrieved at <<http://docstore.mik.ua/orelly/perl3/tk/ch16_01.htm>>, Retrieved Date Nov. 26, 2010, pp. 1-4.

"Windows Azure and Cloud Computing," Retrieved at <<http://oakleafblog.blogspot.com/2010/09/windows-azure-and-cloud-computing-posts_09.html>>, Sep. 9, 2010, pp. 1-68.

Ayachit et al., "Customizing ParaView," Retrieved at <<http://www.itk.org/Wiki/images/7/77/Branding_paper.pdf>>, Oct. 2009, 3 pages.

(56) References Cited

OTHER PUBLICATIONS

Banerjee, Atanu, "The 2007 Microsoft Office System and Other Platform Technologies for Building Composite Applications," Retrieved at <<http://msdn.microsoft.com/en-us/library/bb220802.aspx>>, Dec. 2006, 14 pages.

Biddick, Michael, "Six Questions to Ask Before Buying End-to-End APM," Retrieved at <<http://www.networkcomputing.com/end-to-end-apm/6-questions-to-ask-before-buying-end-to-end-apm.php>>, Jun. 21, 2010, pp. 1-9.

Collins, J., "Using Innovation in Technology to Create New Business Models," Retrieved at <<http://www.theshiftonline.com/?p=666>>, Oct. 25, 2010, 3 pages.

Delaney, A., "Direct Data Feed Services," Retrieved at <<http://www.a-teamgroup.com/?dl_id=7460&dl_cm=on&dl_la=0&dl_ls=0>>, Jun. 2010, 8 pages.

Frisch, A. et al. "Streaming XML transformations using term rewriting"—Published Date: 2007; http://pauillac.inria.fr/~frisch/xstream/long.pdf.

Gardarin, G. et al. "XML-based Components for Federating Multiple Heterogeneous Data Sources" Lecture Notes in Computer Science—Published Date: 1999; http://dntt.free.fr/publi/er1999.pdf.

Janeiro, et al., "Improving the Development of Service-Based Applications Through Service Annotations," Retrieved at <<http://www.rn.inf.tu-dresden.de/uploads/Publikationen/AnnotationPaperWWW-Internet2009.Pdf>>, 2009, 8 pages.

Jelinek, J. et al. "XML Visualization Using Tree Rewriting"—Published Date: 2004; http://mummy.intranet.gr/includes/docs/Conferences/_02_XMLvisualization-Jelinek-SCCG04.pdf.

McNee et al., "Creating Auction Ads for Marketplaces," Retrieved at <<http://e-articles.info/e/a/title/Creating-Auction-Ads-for-Marketplaces/>>, Apr. 2007, pp. 1-2.

Mostarda et al., "MU: an hybrid language for Web Mashups," Retrieved at <<http://em-up.googlecode.com/svn/wiki/papers/www2009.pdf>>, 2009, 10 pages.

Nagel, Nick, "Enterprise Data Modeling Using XML Schema," Retrieved at <<http://citeseerx.ist.psu.edu/viewdoc/download?doi=10.1.1.135.6120&rep=rep1&type=pdf>>, 2007, 30 pages.

Page, S. "XSL Pipeline Processing"—Published Date: Jul. 2, 2007; http://www.usingxml.com/Transforms/XslPipelines.

Spillner et al., "Flexible Human Service Interfaces," Retrieved at <<http://citeseerx.ist.psu.edu/viewdoc/download?doi=10.1.1.70.7734&rep=rep1&type=pdf>>, 2007, 7 pages.

White, Colin J., "IBM enterprise analytics for the intelligent e-business," Retrieved at <<http://sysdoc.doors.ch/IBM/bi.pdf>>, Sep. 2001, 34 pages.

Ravindran, Karthik, "Integrating LOB Systems with the Microsoft Office System", Retrieved at <<http://msdn.microsoft.com/en-us/library/bb896607.aspx >>, Nov. 2007, pp. 1-18.

Johnson et al., "Building ETL Processes for Business Intelligence Solutions", Retrieved at <<http://www.ca.com/files/whitepapers/ca-erwin-building-etl-processes-sql-wp-us-en.pdf>>, Jul. 10, 2008, pp. 6.

"Non-Final Rejection in U.S. Appl. No. 12/972,205", Dated: Nov. 26, 2012, pp. 33.

"Non-Final Rejection in U.S. Appl. No. 12/971,638", Dated: Aug. 30, 2012, pp. 19.

"Non-Final Rejection in U.S. Appl. No. 12/971,685", Dated: Jul. 13, 2012, pp. 10.

"Final Rejection in U.S. Appl. No. 12/971,685", Dated: Oct. 11, 2012, pp. 16.

"Non-Final Rejection in U.S. Appl. No. 12/971,725", Dated: Aug. 21, 2012, pp. 11.

"Final Rejection in U.S. Appl. No. 12/971,725", Dated: May 1, 2013, pp. 15.

"Non-Final Rejection in U.S. Appl. No. 12/971,782", Dated: Jul. 13, 2012, pp. 8.

"Final Rejection in U.S. Appl. No. 12/971,782", Dated: Jan. 31, 2013, pp. 11.

"Quella Business Intelligence Package", Retrieved on: Jun. 19, 2013, Available at: https://secure.shareit.com/shareit/product.html?affiliateid=200070834&productid=300110398.

"Non-Final Office Action Issued in U.S. Appl. No. 12/972,249", Mailed Date: Jul. 31, 2014, Filed Date: Dec. 17, 2010, 30 pages.

"Non-Final Office Action Issued in U.S. Appl. No. 12/971,685", Mailed Date: Apr. 24, 2014, Filed Date: Dec. 17, 2010, 15 Pages.

"Final Office Action Issued in U.S. Appl. No. 12/971,638", Mailed Date: Feb. 25, 2014, Filed Date: Dec. 17, 2010, 11 Pages.

"Non-final Office Action Issued in U.S. Appl. No. 12/971,725", Mailed Date: Jun. 23, 2014, Filed Date: Dec. 17, 2010, 18 Pages.

"Non-final Office Action in U.S. Appl. No. 12/971,782", Mailed Date: Apr. 10, 2014, Filed Date: Dec. 17, 2010, 10 Pages.

"Final Rejection in U.S. Appl. No. 12/972,205", Dated: Jun. 7, 2013, pp. 35.

* cited by examiner

BUSINESS INTELLIGENCE DOCUMENT

CROSS-REFERENCE TO RELATED APPLICATIONS

The present application is related to pending U.S. patent application Ser. No. 12/971,685, entitled "Data Feed Having Customizable Analytic and Visual Behavior"; Ser. No. 12/971,638, entitled "Data Mining in a Business Intelligence Document"; Ser. No. 12/971,725, entitled "Automated Generation of Analytic and Visual Behavior"; Ser. No. 12/971,782, entitled "Business Application Publication"; Ser. No. 12/972,205, entitled "Representation of an Interactive Document as a Graph of Entities"; and Ser. No. 12/972,249, entitled "Representation of an Interactive Document as a Graph of Entities", all filed concurrently herewith and all of which are specifically incorporated by reference herein for all that they disclose or teach.

BACKGROUND

Business intelligence (BI) refers to a broad category of applications and technologies for gathering, storing, analyzing, and providing access to data to help information workers (IWs) make better business decisions. BI applications typically address activities such as decision support systems, querying, reporting, online analytical processing (OLAP), statistical analysis, forecasting, and data mining. BI tools allow IWs to create and execute a certain class of BI applications over a multi-dimensional data model, such a pivot table, a cube, or other hierarchical dimensional storage, thereby achieving sophisticated analytical results from increasingly complex data.

BI applications allow information workers (IW) to collect, store, analyze, and present data and analysis results intended to inform business decisions. In a typical scenario, an IW identifies one or more data sources from which data of interest may be obtained. Information Technology (IT) personnel then apply tools and techniques of ETL (extract/transform/load) to extract the desired data from the data sources, reformat (i.e., transform) the extracted data for the IW's specific BI application, and load the transformed data into a preferred datastore. The IW can then execute a BI application (as defined by a BI document) to analyze the data of interest in the preferred datastore and present the analysis results (e.g., via visualizations). For example, an IW can collect data from a data marketplace of sports scores and statistics and execute a BI application in a spreadsheet-like tool that allows the IW to analyze the scores and statistics (such as by applying specialized calculations, adjusting data constraints, groupings, and/or filters, etc.). The BI application also defines functionality for presenting the analysis results, such as in the form of a spreadsheet-like table, a graphical chart, a user interface comparing multiple scenarios based on different input data values and analysis parameters, etc.

As mentioned above, an initial operation of BI typically involves the collection and reformatting of arbitrary complex data from various data sources into a preferred datastore and format. This collection operation is commonly referred to as "extract, transform, and load" or ETL—the data is extracted from various sources, transformed to satisfy operational needs, and loaded into the preferred datastore (e.g., a hierarchical database). ETL generally refers to bringing data, some of which is external, into the preferred datastore where subsequent BI operations can analyze it locally (e.g., at a local client or server). It should be understood, however, that some semantics may be lost when complex data is transformed into a preferred datastore format for BI. Furthermore, extraction of data from the original data sources to the local BI system may result in the loss of certain analytical capabilities provided by those original source systems.

Moreover, modern data models have shifted dramatically, introducing a new consumption and delivery model on which cloud computing is based. Cloud computing takes advantage of Internet-based, dynamically scalable, and often virtualized data resources. Such data resources can be continuously changing in both content and location. The traditional ETL model of fetching data and analyzing locally (e.g., at a single client or server) does not easily accommodate such a new data model. Furthermore, modern mobile computing devices may not be configured internally (e.g., with enough memory or a powerful enough processor) to handle the storage and computation requirements of many BI operations.

SUMMARY

Implementations described and claimed herein address the foregoing problems by providing a BI document that preserves references to the identities and formats of remote data sources and allows a local computing device to offload analytical operations to remote data sources. In one implementation, the BI document specifies a graph of entities (nodes) connected by directed edges from the output of one entity to an input of another entity. An entity, for example, can represent without limitation a data structure, an external data source, a control element, an external event source, a visualization, or an update service. In one aspect, the entities of a BI document at a local computing device can reference data at an original data source—rather than extracting data from the original data source to a preferred local datastore. Furthermore, an entity of the BI document can direct a remote data source to execute transformations on the remote data before returning a solution to the local computing device. In this manner, BI transformations can be accomplished by original, remote data sources or other computational resources that are better equipped (e.g., more available resources, better solver, etc.) than the local computing device. The resulting solutions can then be input to the BI application's other expressions, as defined by the BI document.

In some implementations, articles of manufacture are provided as computer program products. One implementation of a computer program product provides one or more computer program storage media readable by a computer system and encoding a computer program. Another implementation of a computer program product provides one or more computer program storage media encoding a data structure. Other implementations are also described and recited herein.

Other implementations are also described and recited herein.

DETAILED DESCRIPTIONS

The described technology enhances a BI application by allowing designation of remote data and computations within a BI document. In this manner, the BI application can offload certain computations to remote data sources, thereby avoiding local data collection, transformation, storage, and computation at a local computing system for certain aspects of its operation. For example, circumstances may exist to make local storage and analysis of certain relevant data impractical (e.g., on a mobile device, a heavily loaded server, or a device not equipped with the best available solver). Accordingly, offloading certain computations on certain data to a remote system may improve resource utilization in a BI environment.

A BI document of the described technology can group arbitrary expressions (e.g., transformations) into individual entities, which can be connected as nodes in a graph, to compose the BI application. An output of one entity may be connected to the input of another entity to create a pipeline of expression-containing entities. Each entity may be designated for local or remote computation, independent of each other entity, and the expressions of each entity may be evaluated by either a local system or a remote system, depending on the designation of the entity. As such, the content and connections of each entity can combine to yield a sophisticated BI application specifying arbitrary combinations of local and remote computations using local and remote data sources.

It should be understood that data sources may emit either data (e.g., remotely-resident data, remotely-computed solutions) or expressions. For example, a data source may return data from a database residing at a remote data warehouse or may return solutions based on remote or local data, wherein the solutions were evaluated at a remote computing system. Where the remote computing system does not provide its own data, the data source may be referred to as a "pure solver." A data source that emits expressions may also be referred to as a "service."

Figure 1:
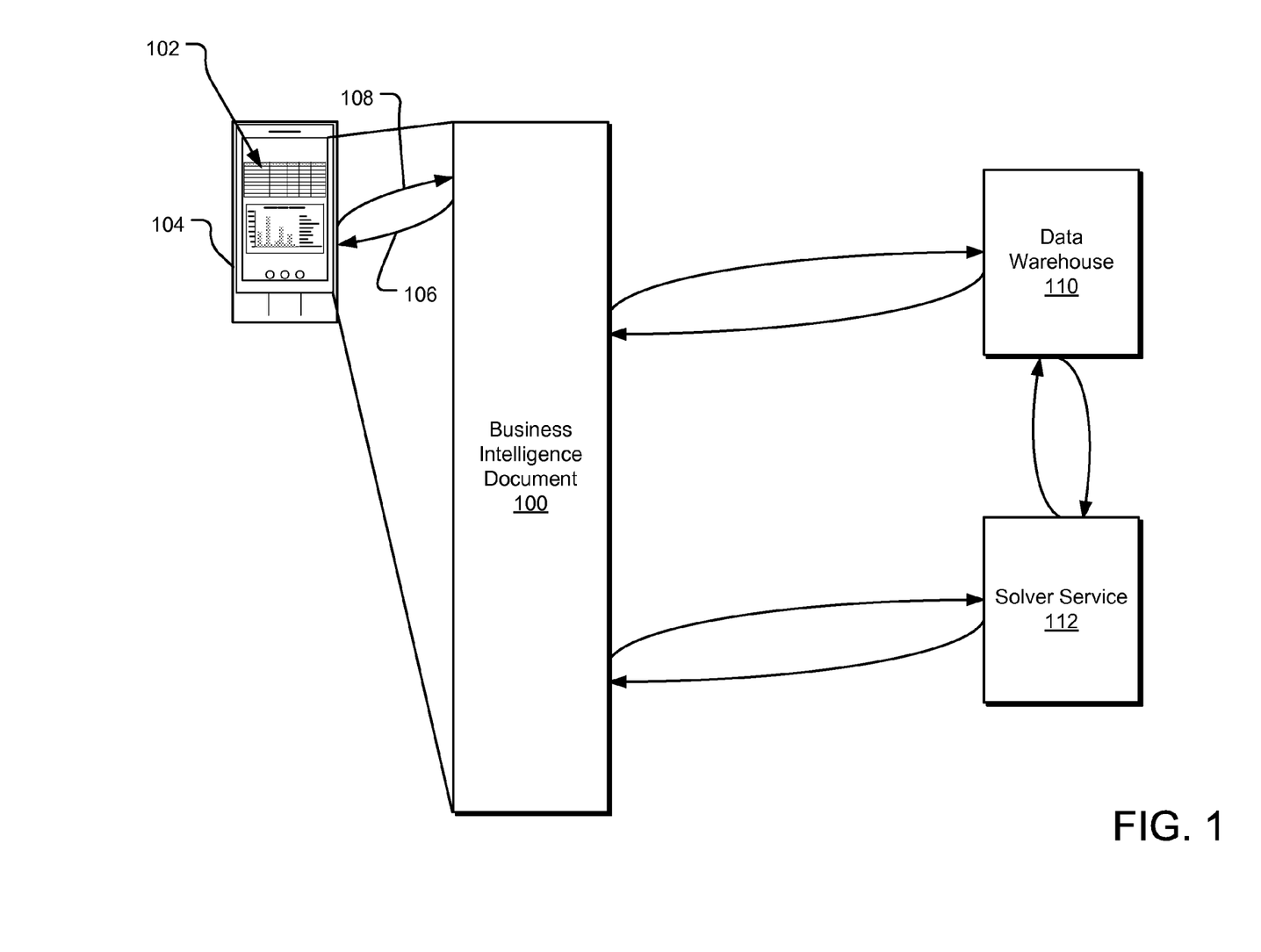
FIG. 1 illustrates an example BI document defining a BI application to compute using local data and operations as well as remote data and operations.

FIG. 1 illustrates an example BI document 100 defining a BI application to perform computations using local data and operations as well as remote data and operations. Certain BI tools, such as a spreadsheet and document-authoring environments, can support an IW in development and execution of such a BI application. A BI tool may also be provided to a user to assist the user in creating the application defined by expressions. For example, such a BI tool may include a visual composition environment. As illustrated, a BI tool 102 (e.g., a spreadsheet-like software tool, a data visualization tool, etc.) executes within a local device 104 on the BI document 100, which defines the BI application. It should be understood, however, that such BI tools may be executed on any number of different types of computing devices, including distributed groups of computing devices (e.g., in a data warehouse or a cluster of computers).

The BI document 100 defines the BI application using a data structure of arbitrary expressions that can be specified by a non-programmer. In one implementation, a BI application defined by sets of such arbitrary expressions are grouped into distinct entities, which may have input variables and output variables, wherein the relationships among inputs and outputs of these entities defined by the sets of expressions that define the entities. The expressions are generally not unique to any particular system but may be evaluated by either a local or remote system. However, an entity (and therefore the contained expressions) may be designated for local or remote computation on local or remote data, thereby directing computation to an appropriate system based on this designation.

Individual entities may be connected into a pipeline of entities, such that an output of one entity (e.g., an external equation set entity for remote computation) is connected to the input of another entity (e.g., an internal equation set entity of local computation), and so on. The input and output formats of connected entities are matched, such that the data output by one entity is compatible with the input format (e.g., schema) required by the entity to which that data is input. The pipeline-connection of multiple entities allows a user to specify a BI application for evaluating complex and arbitrary combinations of expressions using local or remote data and computation to obtain sophisticated BI solutions.

Furthermore, a non-programmer can develop a BI application defined by such expressions. In some implementations, the skill level adequate for a person to develop a BI application defined by expressions may be similar to the skill level adequate to use a spreadsheet software application, such as Microsoft EXCEL®.

An expression is a symbolic representation of a computation to be performed and may include operators and operands. Example operators of an expression may include without limitation mathematical operators (e.g., addition, subtraction, etc.), relational transformations (e.g., group, ungroup, join, filter, sort, etc.), aggregate transformations over nested structures (e.g., hierarchical filtering), classifiers (e.g., Bayesian algorithm that classified an unstructured set of data), BI aggregations and transformations, and arbitrary or customized transform expressions (e.g., sets of rules, equations, and/ or constraints). Example operands of an expression may include without limitation data (e.g., numbers or strings), hierarchical data (such as records, tuples, and sequences), symbols that represent data, and other expressions that resolve to specific data. An expression may thus be recursive in that an expression may be defined by other expressions.

For example, an expression may take the form of a symbolic representation of an algebraic expression, such as $x^2+2xy+y^2$, where x and y are symbols that represent data or other expressions. A symbol may represent any type of data, including without limitation an integer, a rational number, a string, a Boolean, a sequence of data (potentially infinite), a tuple, or a record. In some implementations, a symbol may also represent an irrational number, although in other implementation, a symbol may be prohibited from representing an irrational number. Any expression may take the form of an equation, such as $E=mc^2$, where E, m, and c are symbols representing data or other expressions. An expression may also take the form of a functional definition, such as $f(x)=x^2-1$, where $f$ is a symbol representing the function, x is a symbol representing an operand or argument of the function, and $x^2-1$ is an expression that defines the function. In addition, an expression may take the form of a function invocations, such as $f(3)$, which indicates that the function $f$ is to be invoked with an argument of "3".

An expression may be solved by an expression engine (see expression engine 216 in FIG. 2) to produce a result (e.g., a solution or output). For example, where the symbol x (which is itself an expression) represents the number "3" and the symbol y (which is also an expression) represents the number "2," the expression $x^2+2xy+y^2$ may be solved by replacing the symbols with the values they represent, e.g., $2^2+2\cdot2\cdot3+3^2$, and then applying the operators to the operands to solve the entire expression to equal "25." In another example, where m is a symbol representing the number "2" and c is a symbol representing the number "2," the expression E, defined above, may be solved by replacing E with its definition (e.g., $mc^2$), replacing the symbols m and c with the values they represent (e.g., $2\cdot3^2$) and applying the operators to the operands to solve the expression to equal "18."

In evaluating an expression, the expression engine may apply the operators to the operands to the extent that the operators and operands are defined and to the extent that the expression engine is configured to apply the operators to the operands. For example, where the symbol x represents the number "3" and the symbol "y" is not yet defined, the expression $x^2+2xy+y^2$ may be solved by replacing the known symbol "x" with the value it represents (e.g., $2^2+2\cdot2\cdot y+y^2$) and then applying the operators to the operands to solve the entire expression as $4+4y+y^2$. Where the symbol x represents the number "3" and the symbol y represents the string "hello", the expression $x^2+2xy+y^2$ may be solved as $4+4\cdot hello+hello^2$, since the expression engine may not be configured to perform arithmetic operations on the string "hello".

Each expression can further specify a data source, whether local or remote. For example, an expression in which data values for x are taken from a local data source and data values for y are taken from a remote data source may be declared as follows:

$x^2+2xy+y^2$|where x in local_table_contacts.Age and y in remote_table_contacts.Income Furthermore, each expression can further designate local or remote computation. For example, the computation entity may be specifically identified for an expression as such:

$x^2+2xy+y^2$|local source.Solver or $x^2+2xy+y^2$|remote_source.Solver

In some implementations, expressions without a computation identifier are deemed local by default.

In some implementations, expression may be declarative. A declarative expression can identify a computation to be performed without specifying how to compute it. A declarative expression may be contrasted with an imperative expression, which may provide an algorithm or other specification for computing the expression. Declarative expressions may be input manually, such as into a field in a spreadsheet tool, or created through a declaration-generating control, such as a visual control element associated with a visualization (see e.g., control element 608 in FIG. 6).

In some implementations, expressions may be immutable. An expression is immutable if it cannot be changed. For example, once a definition is given to an immutable expression, such as if $E=mc^2$ is designated immutable, the expression E cannot later be given a different definition. One advantage of immutability is that a BI application having one or more expressions designated as immutable prevents users of the BI application from altering those expressions. Where expressions are being solved in a distributed execution environment, immutability may be advantageous in that devices can rely on the immutable expression having the same definition throughout the lifetime of the expression Immutability of expressions can make it easier for independent parts of a BI application to execute in parallel.

As discussed, a BI application may be defined by a data structure of expressions. In one implementation, the BI application is represented by a graph of nodes or entities specified in the BI document, wherein one or more expressions are partitioned into individual entities and connected via related inputs and outputs. Based on the BI document 100, the BI application can provide spreadsheet-like, incremental recalculation behavior ("recalc"), solving expressions as the data upon which they depend changes. In addition, the BI tool 102 and the BI document 100 are coordinated to allow BI and other operations over heterogeneous complex data, including data sourced from local and remote data sources.

In one implementation, declarative expressions are recorded in the BI document 100 to define one or more entities in the graph, each entity representing without limitation a data structure, an external data source, a control element, an external event source, a visualization, or an update service. In one implementation, each entity transforms its inputs (if any) into its outputs (if any) and is associated with:

zero or more inputs from other entities, each input configured to accept data from outputs of other entities;

transform expressions that take a set of inputs and create a collection; and zero or more outputs accessible by other entities, each output configured to emit output data generated by the entities transforms.

Figure 3:
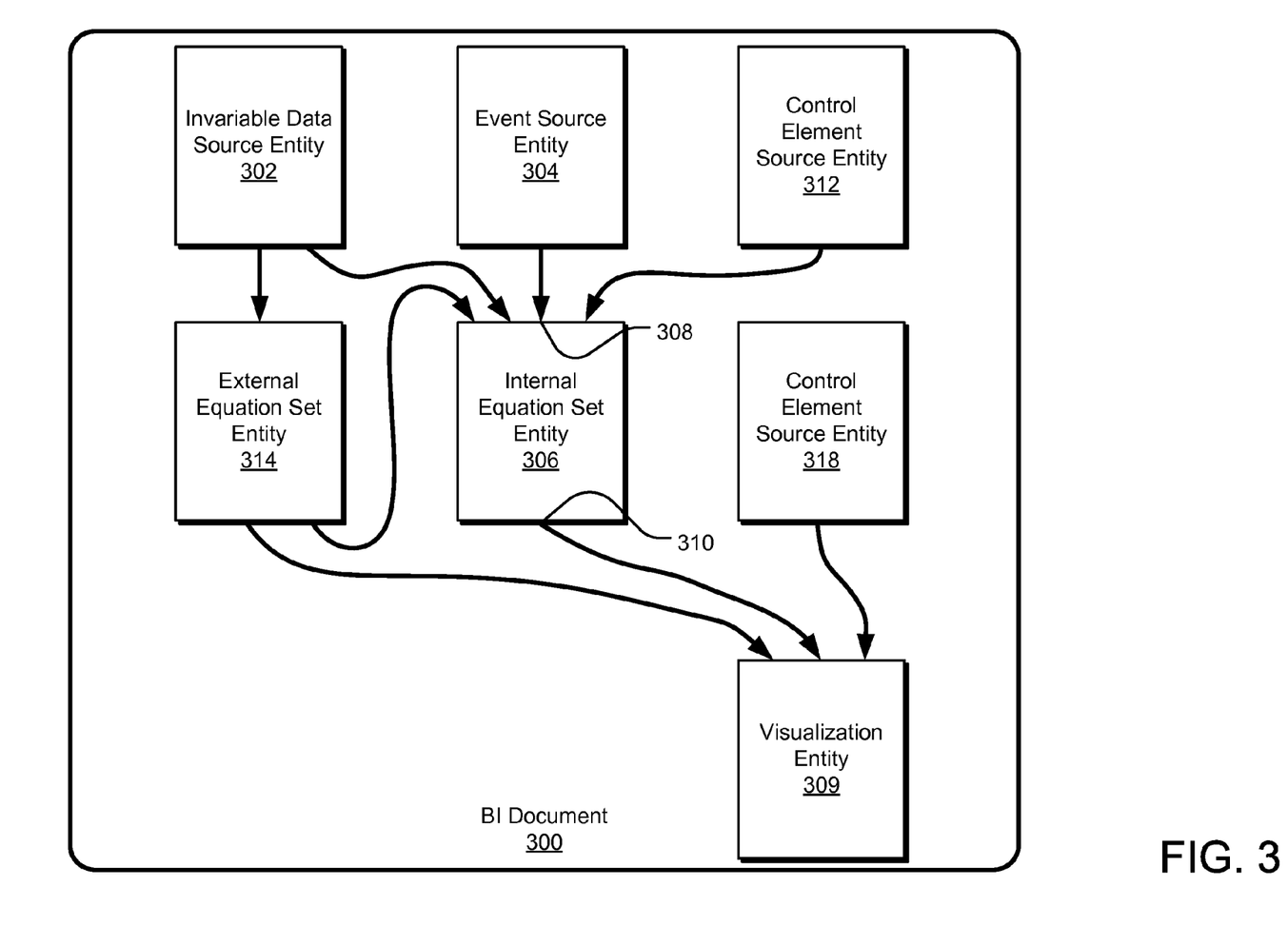
FIG. 3 illustrates an example BI document specifying a graph of connected entities (e.g., transformation nodes).

More details pertaining to entities are described with regard to FIG. 3.

Arrow 106 represents expressions of an entity defined in the BI document 100 being computed on the local device 104 with local data, wherein the solution is logically "returned" to the BI application defined by the BI document 100 as arrow 108. As an alternative to or in addition to specifying local computations on local data, another entity defined in the BI document 100 can reference data resident at a remote data source (such as the data warehouse 110). Furthermore, the entity can offload a portion of the BI application's computation to the data warehouse 110 or to a separate remote computation service (e.g., remote solver service 112). In either case, the data warehouse's solution and the solver's solution can be returned to the BI application when complete.

In should also be understood that the data warehouse 110 and/or the remote solver service 112 may also offload portions of the computations they been assigned by the application (as defined in the BI document 100) running on the local device 104. For example, if the data warehouse 110 receives expressions from the local device 104 for computation and the data warehouse 110 determines that it is unable or inappropriate for performing the computation (e.g., the solver service 112 has a better solver), the data warehouse 110 can offload one or more of the received expressions to the solver service 112, which can perform the computation and return the solution to the data warehouse 110. This sequential offloading forms a type of "offload chain." The data warehouse 110 then returns the solution, or some solution that depends from this solution, to the local device 104. Furthermore, the solver service 112 can also extend the offload chain to yet another remote computation system. The local device 104 is agonistic about how the remote systems obtain their solutions (e.g., whether handling the computation themselves or offloading to other remote systems). In this manner, an offload chain can be established among multiple systems, such that the local device 104 offloads certain expressions to one or more remote systems and simply expects these remote systems to return corresponding solutions.

Figure 2:
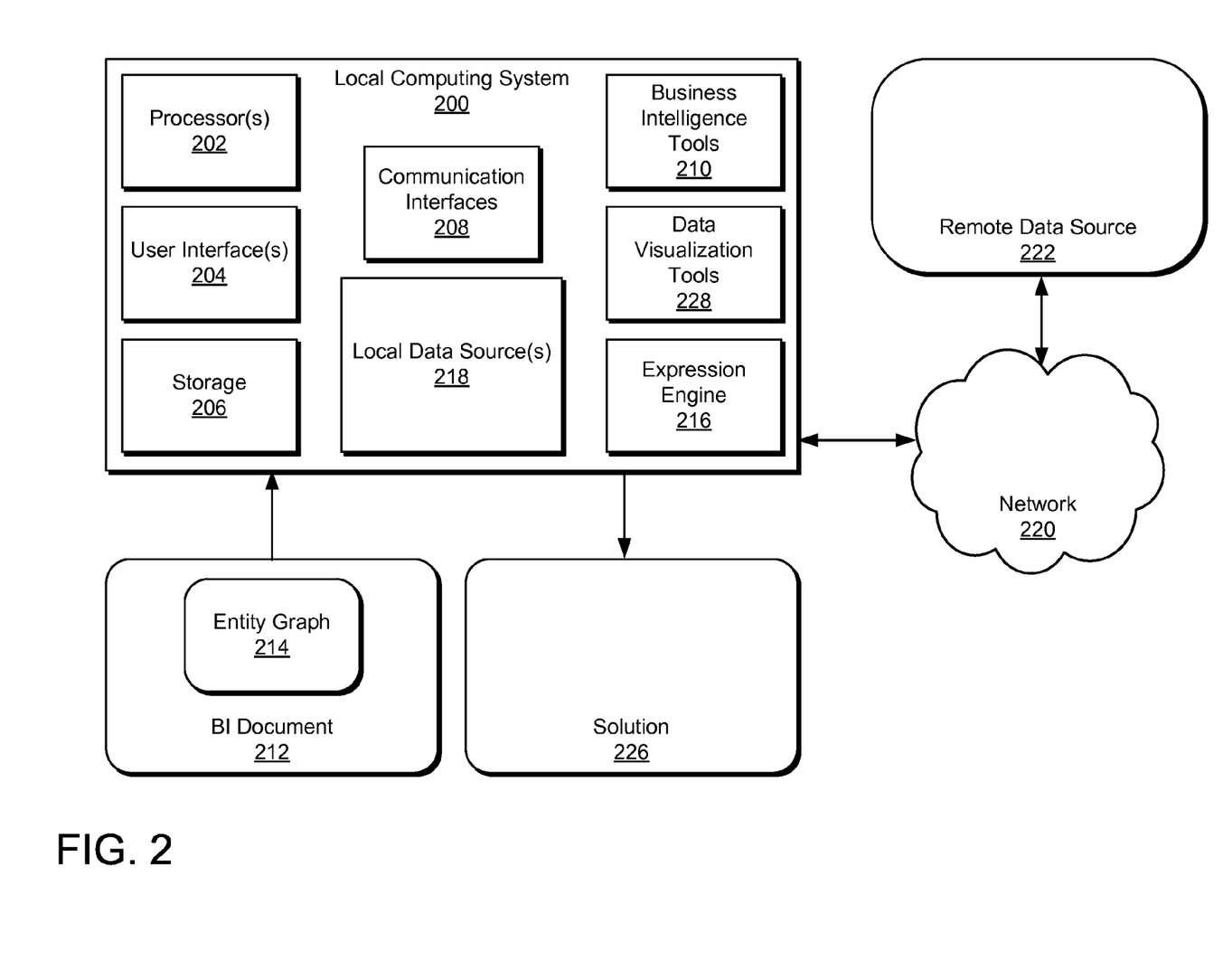
FIG. 2 illustrates an example local computing system capable of computations using local data and operations as well as remote data and operations.

FIG. 2 illustrates an example local computing system 200 capable of computations using local data and operations as well as remote data and operations. The computing system 200 includes components includes one or more processors 202, one or more user interfaces 204 (e.g., visual display interfaces, keyboard and mouse interfaces, touch screen interfaces, etc.), data storage 206, which may include memory as well as magnetic, optical, and solid state storage drives, and one or more communications interfaces 208 (e.g., wireless and/or wired networking interfaces). These components provide support for executing BI tools 210 (e.g., a spreadsheet tool) and data visualization tools 228 based on a BI document 212 that defines a BI application.

One of the BI tools 210 can input the BI document 212 and process an entity graph 214 recorded in the BI document 212. As discussed with regard to FIG. 3, the entity graph 214 represents one or more entities, each entity specifying one or more expressions and having one or more inputs and/or outputs, wherein the entities are connected between an input of one entity and an output of another entity.

In one implementation, the BI tool 210 analyzes the entity graph 214 and determines the data source designated to operate on each entity. Each entity designates data against which its expressions are to be evaluated. Some entities designate expressions for local computation on local data; other entities designate expression for remote computation on remote data. For local computation entities, the local computing system 200 employs a local expression engine 216, and one or more local data sources 218 to solve the expressions defined in the entities. It should be understood that "local" refers to data or computation within a device or a local area network (LAN) (e.g., at a local server), as compared with "remote," which refers to data or computation outside of a LAN, such as on a wide area network (WAN). Examples of remote data and computation would reside in the "cloud," such as at one or more Internet connected web services or data warehouses.

For remote computation entities, the local computing system 200 communicates the expressions specified in each entity (e.g., through a network 220) to a designated remote system for remote computation. In one implementation, a remote data source 222 employs one or more of its own data sources to solve the expressions defined in the entities. In one implementation, the remote data source includes an expression engine that interpret the expressions received from the local computing system 200 to allow the remote system to access data and perform computations designated in the received expressions.

The solutions for a remotely computed entity are communicated from the remote system to the local computing system 200 for use in the BI applications (e.g., for input to other entities defined in the BI document 212). The solution 226 of the BI application is output to the user, such as via a visualization (e.g., a map, a graph, etc.) displayed on a display device via one or more of the user interfaces 204.

FIG. 3 illustrates an example BI document 300 specifying a directed acyclic graph (DAG) of connected entities 302, 304, 306, 309, 312, and 314). Each entity is characterized by zero or more inputs (such as input 308), zero or more outputs (such as output 310), and a specified set of expressions (e.g., transforms) that can receive an input from another entity and/or create a collection for output to another entity.

Each entity can represent without limitation a data structure (e.g., a table or a hierarchical table), a terminal entity (e.g., a visualization or update service), a set of expressions with its bindings to identified data, an external data source (e.g., a remote data source, a query-able data source, a non-query-able data source, a control element that provides user interaction to allow data input, a remote service, etc.), and external event sources (e.g., timers). Each entity also defines the format of its one or more inputs and/or outputs. If the entity has an input, the entity further defines the source of the input data. The one or more expressions specified by each entity define transforms to be performed by the entity on its inputs (if any), the result of which is the output (if any) of the entity.

Individual entities may be characterized in a variety of ways, as described with regard to the example list below:

An equation set is represented as an entity having one or more inputs receiving data for computations and having one or more outputs for supplying the results of the computation to a subsequent entity in the directed graph, wherein the expressions specified by the entity represent the computations made on the input data to generate the output data.

An invariable data source may be represented as an entity with no inputs and an output capable of supplying data to a subsequently connected entity.

An external event source is also represented as an entity with no inputs and an output supplying the data resulting from an event (e.g., a timer event indicating that a timer identifies a current date or time, a user input event indicating that a user has entered the number '3'). An external event source is distinguished from an invariable data source because its output may change based on the state of the particular event.

A visualization is represented as an entity with inputs but no outputs (e.g., a terminal entity). A bar chart visualization, for example, may be represented as an entity having one input supplying its title and another input receiving a collection of pairs of categories and values.

An interactive control element may be specified by associating a visualization entity with an external data source entity representing a control element source entity. The control element source entity has no inputs and an output that supplies values corresponding to the user's manipulation of a displayed control element. By manipulating the associated control element (e.g., moving a slider in a single slider control element), the user causes data to be emitted from the output of control element source entity, which can then be connected to the input of a visualization entity to cause the slider movement to be presented visually to the user. An output of the control source entity would commonly also be input to an equation set, for example, to influence associated computations and potentially other visualizations, although other connections are also contemplated.

An updateable source/sink may also be specified by a pair of entities—a "source" entity, which accepts queries as inputs and emits query results as outputs and a "sink" entity representing a destination to which the query results (e.g., "updates") are output. In this manner, the entities represent in combination a single updatable data source/sink that is similar to the invariable data source but which reflects data changes based on changes in underlying data and the queries it receives.

It should be understood that other types of entities and connections are also contemplated in other implementations. In particular, multiple entities may be connected in a pipeline to produce a complex and arbitrary sequence of expressions designated for local and/or remote computation.

As data that is input to an entity changes, the expression engine re-evaluates the expressions specified by the entity. Accordingly, data changes and re-computation results can ripple through the directed graph, changing the output data that is altered by the re-computations and leaving the outputs of other entities unchanged (where the initial data changes do not ripple to these entities). This incremental change provides a spreadsheet-like recalculation ("recalc") effect—some data changes in the spreadsheet when data is changed, while other data remains unchanged.

Turning back to FIG. 3, the entity 302 represents an invariable data source, having one output but no input, and the entity 304 represents an event source, also having one output but no input, and further having output data that depends on the state of an event. Both the invariable data source entity 302 and the event source entity 304 supply their outputs to an internal equation set entity 306, which specifies one or more expressions for transforming the received data to output data of the entity 306. In this example, the expressions of the internal equation set entity 306 specify local computation and data, not remote computation and data. In contrast, another equation set entity, i.e., external equation set entity 314, specifies one or more expressions designating an external data source. As such, the expressions specified by the entity 314 are communicated to the designated external (e.g., remote) data source for remote computation on remote data. The solutions generated by the remote computation are communicated back to the local computing system for binding to the entity graph.

A control element source entity 312 also has no input and one output. The output data of the control element source entity 312 changes based on the state of an associated control element (e.g., a visual slider control), which can be manipulated by a user. For example, the associated control element may be presented to the user as a slider that the user can slide back and forth within a predetermined range to change the output value of the entity 312. A control element source entity 318 is also connected to the input of a visualization entity 309.

As illustrated, individual entities may be connected into a pipeline, where the local or remote location of the data and the computation for one entity are immaterial to any previous or subsequent entity in the pipeline. For example, an output of the invariable data source entity 302 is connected to the external equation set entity 314 and an output connected to the internal equation set entity 306. The external equation set entity 314 has one output connected to an input of the internal equation set entity 306. It should be understood that the input and output formats of connected entities are compatible to allow a first entity to output data directly to a second entity.

Further, among other connections, inputs to the internal equation set entity 306 are connected to outputs of the invariable data source entity 302, the event source entity 304, and the control element source entity 312. Also, as shown, outputs of the entities 306, 314 and 318 are input to the visualization entity 309, which has three inputs and no outputs. The visualization entity 309 alters a visualization presented to the user based on the data received at its inputs from the entities 306, 314, and 318. In this manner, changes to the outputs of the entities 306, 314, and 318 results in changes to the visual display viewed by user.

Figure 4:
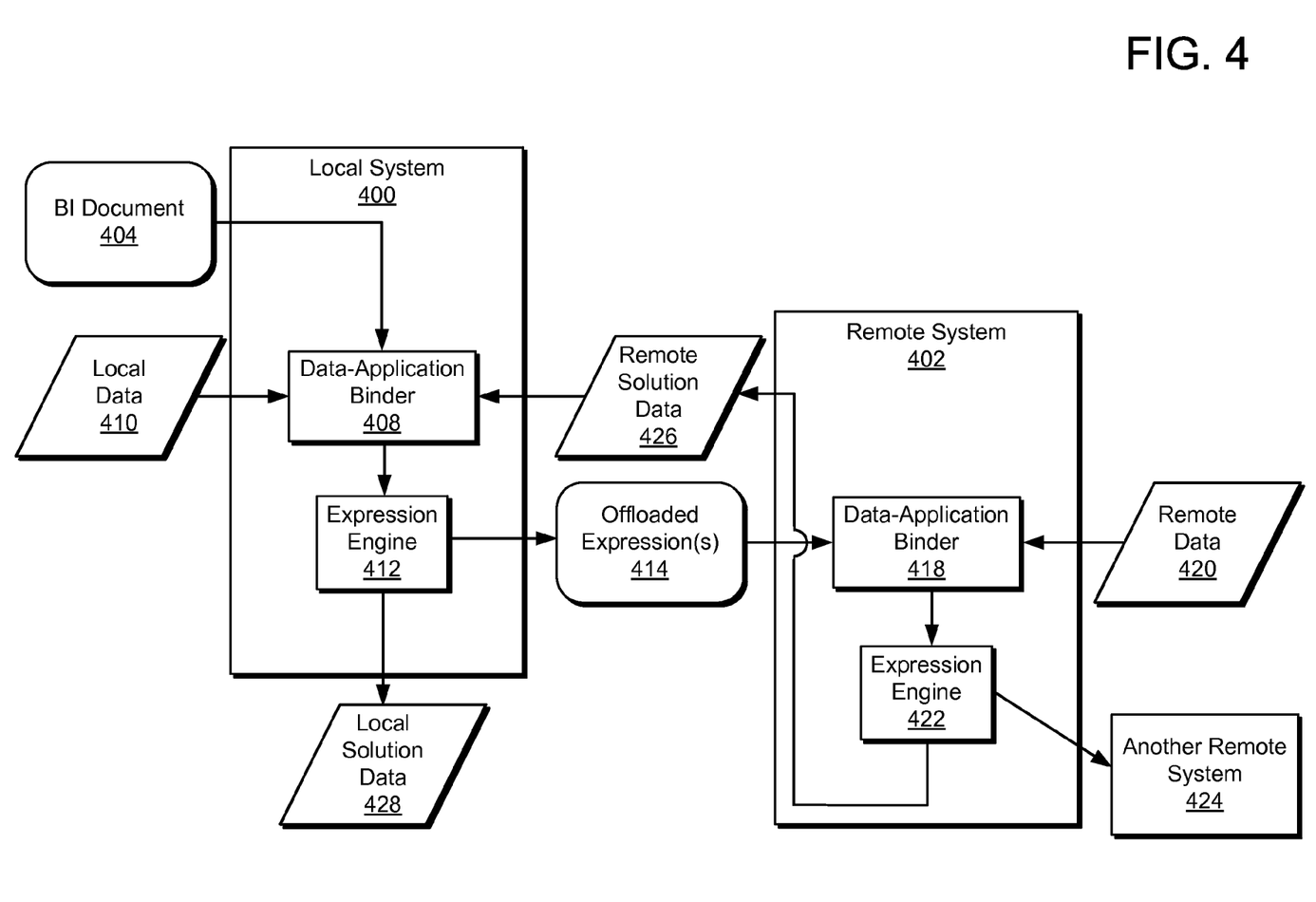
FIG. 4 illustrates a local system and a remote system for solving a BI application defined in a BI document.

FIG. 4 illustrates a local system 400 and a remote system 402 for solving a BI application defined in a BI document 404. The local system 400 receives the BI document 404 and evaluates the entities and expressions specified within. A data-application binder 408 receives the BI document 404, traversing each entity specified therein, and binds available data from local data 410 and remote solution data 426 to expressions in each entity. The entities are then passed to an expression engine 412, which traverses the graph defined in the BI document 404 and, to the extent that it can, computes the expressions in each entity that are designated for local computation on local data.

For those entities designated for remote computation on remote data, the expression engine 412 directs the expressions of each such entity to the appropriate remote data source. As such, if the expression engine 412 identifies an entity designating a remote data source, then the expression engine 412 offloads the entity's expressions (shown as an offloaded expressions 414) to the designated remote system 402. If the designated remote data is available locally to the remote system 402 (e.g., the remote data 420), a data-application binder 418 binds remote data 420 (i.e., data local to the remote system but remote from the local system) to the offloaded expressions 414, to the extent possible, and passes the expressions to an expression engine 422 to evaluate the expressions based on the available data. It should be understood that the expression engine 422 may determine that the designated data and/or computation (or some portion thereof) is not local to the remote system 402 and therefore direct some portion of the offloaded expressions 414 to another remote system 424 where the designated data and/or computation is expected to reside.

Assuming the expression engine 422 evaluates the offloaded expressions 414 against on the remote data 420, the solution of the entity is output as a solution 426 (albeit an intermediate solution to the BI application) and supplied to the data-application binder 408 of the local system 400. In this manner, local data 410 and remote solution data 426 can both be bound to expressions being evaluated by the expression engine 412 to produce local data solution data 428. In addition, certain entities of the BI document 404 may supply output data to a terminal entity, such as a visualization entity, which displays data and analysis results to the user.

Figure 5:
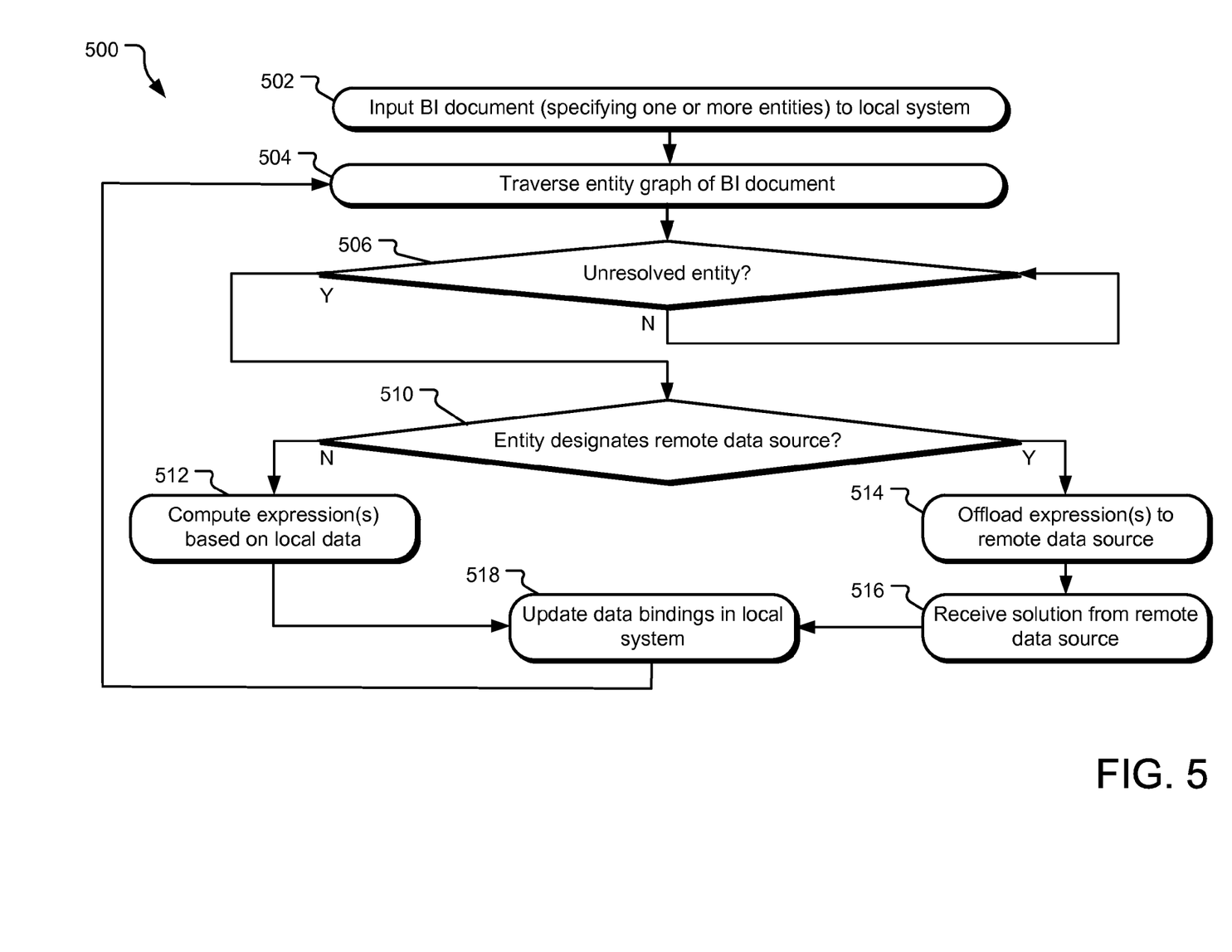
FIG. 5 illustrates example operations for processing a BI document that defines a BI application to compute using local data and operations as well as remote data and operations.

FIG. 5 illustrates example operations 500 for processing a BI document that defines a BI application to compute using local data and operations as well as remote data and operations. An input operation 502 inputs a BI document to a local system. The BI document specifies one or more entities in a directed acyclic graph (DAG). Each entity may include a designation of a local or remote data source and one or more expressions (e.g., transformations) that can be evaluated by an expression engine.

A traversal operation 504 traverses the entity graph of the BI document, visiting each entity in the graph. If an unresolved entity (i.e., an entity having expression that have not been computed or having inputs or a state that have changed since the last visit), as determined by a decision operation 506, a decision operation 510 determines if the entity designates a remote data source. If so, an offloading operation 514 directs the entity's expressions to the designated remote data source, and a solution operation 516 receives a solution computed in return by the designated remote data source. (If no unresolved entity is found by the decision operation 506, processing continues to loop until an unresolved entity is found.)

If the decision operation 510 determines that the entity designates a local data source, then a computation operation 512 evaluates the entity's expressions against the local data. In either case, an updating operation 518 receives the solution of an entity's expression evaluation and updates data bindings in the local system based on this result. Thereafter, the traversal operation 504 continues its search for unresolved entities.

Figure 6:
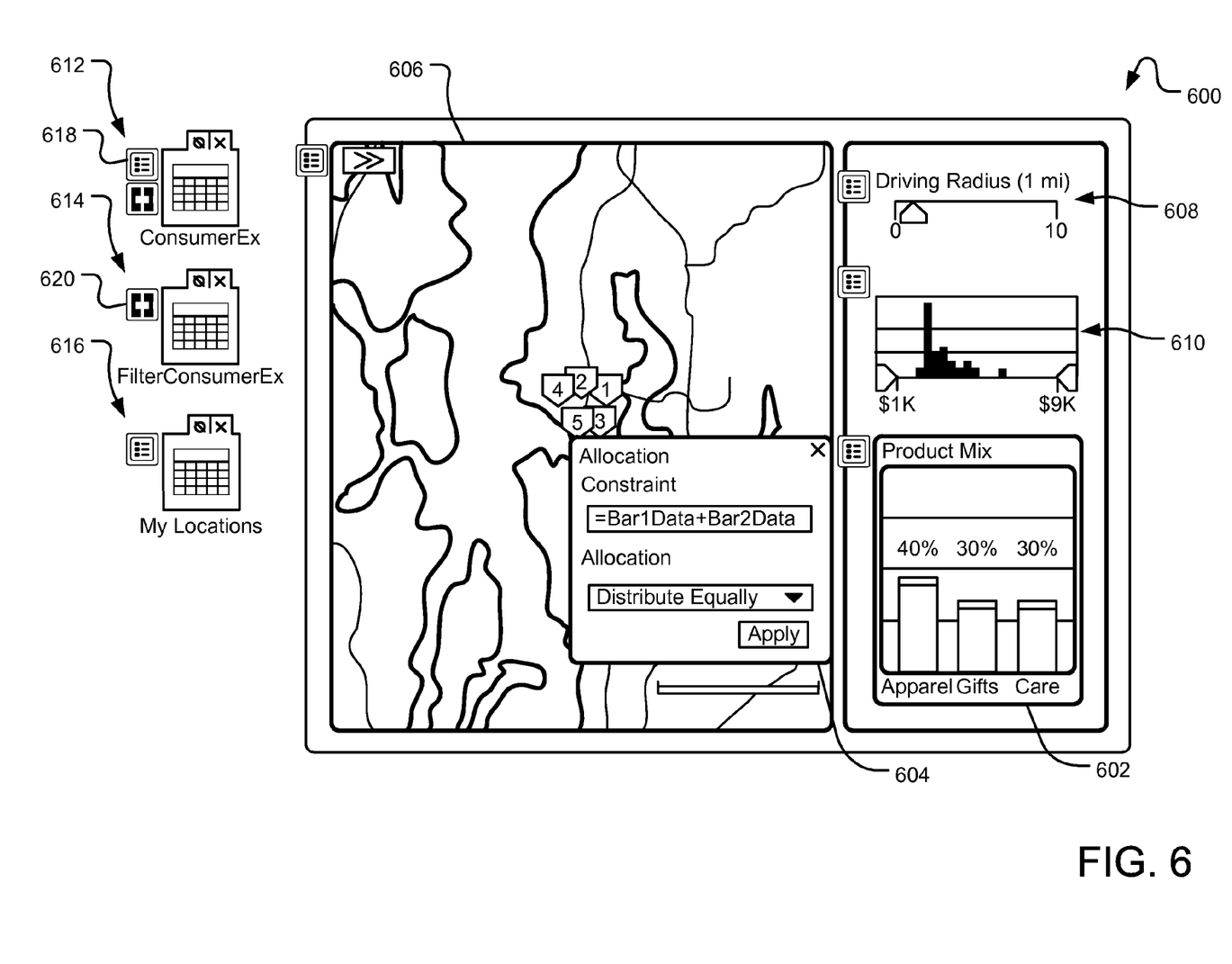
FIG. 6 illustrates example visualizations presented from a BI application defined by a BI document, wherein a new visualization is being configured by a user through a declarative interface.

FIG. 6 illustrates example visualizations 600 presented from a BI application defined by a BI document, wherein a new visualization 602 is being configured by a user through a declarative interface 604. Each visualization represented by a terminal entity in a graph associated with a BI document presents a user with a view of input data and solutions resulting from associated transformations. In some cases, such as the map visual 606, map data is combined with solution data (e.g., the symbols marked "1", "2", "3", "4", and "5" on the map). The solution data results from underlying input data, transformations, and other input values configured through user interaction with the single slider control element 608 and the range control 610.

The new histogram visual element 602 is also based on input data and transformations, some of which are defined by a user through the control element 604. In the case of the control element 604, a user can configure a "constraint" transformation using a user-entered equation and an "allocation" transformation using a drop down box offering various selections (e.g., "Distribute Equally," "Weighted," etc.) Other transformations may also be applied to the input data in the configuration of the histogram visual 602 or any other visual element.

Other application controls are also shown in FIG. 6. The controls 612, 614, and 616 represent data source entities in a graph of entities. By selecting a data grid control, such as data grid control 618, a user can access the underlying input data of an associated data source. By selecting a logic control, such as logic control 620, a user can access the underlying business logic (e.g., transformations) applicable to the underlying input data.

Figure 7:
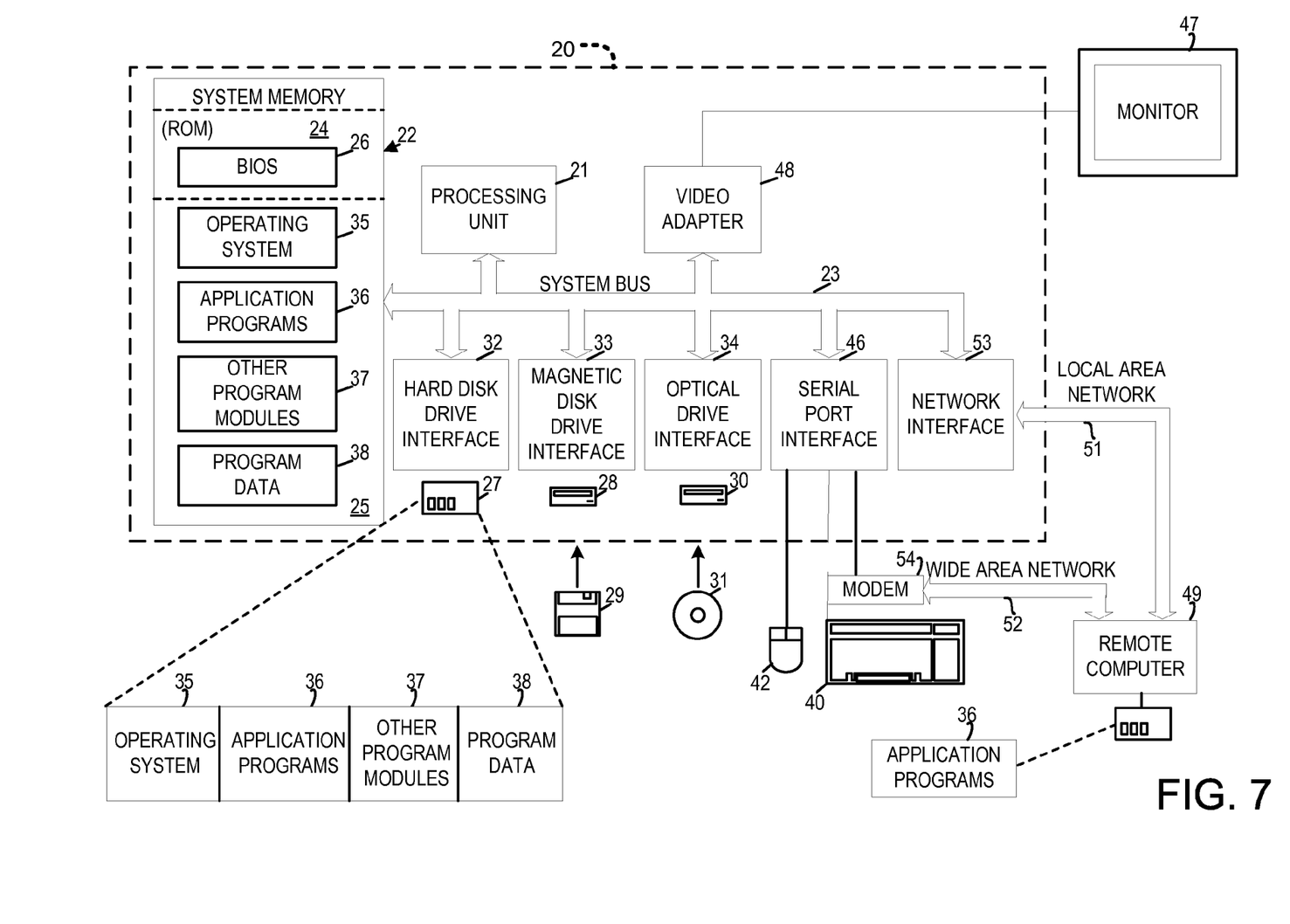
FIG. 7 illustrates an example system that may be useful in implementing the described technology.

FIG. 7 illustrates an example system that may be useful in implementing the described technology. The example hardware and operating environment of FIG. 7 for implementing the described technology includes a computing device, such as general purpose computing device in the form of a gaming console or computer 20, a mobile telephone, a personal data assistant (PDA), a set top box, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, a DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an expression engine, a data source, a computation service, and other modules and services may be embodied by instructions stored in memory 22 and/or storage devices 29 or 31 and processed by the processing unit 21. Source data, BI documents, and other data may be stored in memory 22 and/or storage devices 29 or 31 as persistent datastores. Further, local computing systems, remote data sources and/or services, and other associated logic represent hardware and/or software configured to provide BI functionality for network-connected systems. Such sources and services may be implemented using a general purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   receiving into memory of a local computing system a description of a plurality of pipeline-connected entities defining a business intelligence application based on a business intelligence document, wherein the business intelligence application is defined and runs on the local computing system, the plurality of pipeline-connected entities include:
      a first entity including one or more expressions and designating a remote data source, the first entity directing the remote data source to transform data of the remote data source using the one or more expressions in the first entity,
      a second entity including one or more expressions and designating the local computing system, the second entity directing the local computing system to transform data of the local computing system using the one or more expressions of the second entity, and
      a visualization entity including one or more expressions defining a user interface;
   updating one or more connected entities in memory based on a remotely computed result of the first entity and a locally computed result of the second entity; and
   presenting a combination of the remotely computed result of the first entity and the locally computed result of the second entity via the user interface defined by the visualization entity;
   wherein the description of the plurality of connected entities forms a directed acyclic graph and independent parts of the business intelligence application are executed in parallel.

2. The method of claim 1 further comprising:
   communicating the one or more expressions of the first entity to the remote data source; and
   receiving the remotely computed result of the first entity from the remote data source.

3. The method of claim 1 further comprising:
   evaluating the one or more expressions of the second entity against the designated local data to yield the locally computed result.

4. The method of claim 1 wherein the one or more expressions of the first entity specify a symbolic representation of a computation to be performed on the designated data of the remote data source, wherein each expression are solvable by an expression engine of the remote data source.

5. The method of claim 1 wherein the first entity defines an output communicating to an input of another entity of the description, wherein the data value at the output is the remotely computed result.

6. The method of claim 1 wherein an input of an entity is formatted to accept an output of another entity.

7. A computer-readable storage memory storing a data structure, the data structure comprising:
   a set of pipeline-connected entities defining a business intelligence document, the business intelligence document being defined and used at a local computing device to define a business intelligence application that runs on the local computing device, the set including:
      a first entity including one or more expressions and designating data of a remote data source, data of a local computing device, and a computation identifier for evaluation of the one or more expressions of the first entity, wherein the one or more expressions of the first entity are evaluated, based on the computation identifier, by transforming the data of the remote data source and data of the local computing device by the remote data source to yield a remotely computed result,
      a second entity including one or more expressions and designating data of a local computing device against which the one or more expressions of the second entity are to be locally evaluated to yield a locally computed result, and
      a visualization entity including one or more expressions defining a user interface, wherein the data of the local computing device and the remotely computed result are transformed to yield the locally computed result, at least one of the remotely computed result of the first entity and the locally computed result are presentable via the user interface defined by the visualization entity;
   wherein the set of pipeline-connected entities forms a directed acyclic graph and wherein independent parts of the business intelligence application are executed in parallel.

8. The one or more computer-readable storage memory of claim 7, wherein the set of connected entities are updateable based on the remotely computed result of the first entity and the locally computed result of the second entity.

9. The one or more computer-readable storage memory of claim 7 wherein an expression engine at the local computing device determines, using the computation identifier, that the first entity designates the remote data source for computation of the one or more expressions of the first entity.

10. The one or more computer-readable storage memory of claim 7 wherein the one or more expressions of the first entity are capable of communication to the remote data source.

11. The one or more computer-readable storage memory of claim 7 wherein the one or more expressions of the first entity specify a symbolic representation of a computation to be performed on the designated data of the remote data source, wherein each expression is solvable by an expression engine of the remote data source.

12. The one or more computer-readable storage memory of claim 7 wherein the first entity defines an output communicating to an input of another entity of the description, wherein the data value at the output is the remotely computed result.

13. A computer-readable storage memory storing computer-executable instructions for executing on a computer system a computer process, the computer process comprising:
- receiving into memory of a local computing device a description of a plurality of pipeline-connected entities defining a business intelligence application based on a business intelligence document, wherein the business intelligence application is defined and runs on the local computing device, and wherein the plurality of pipeline-connected entities include:
  - a first entity including one or more expressions, the one or more expressions of the first entity designating data of a remote data source and data of the local computing device against which the one or more expressions of the first entity are to be evaluated by the remote data source by transforming the data of the remote data source and data of the local computing device,
  - a second entity including one or more expressions and designating data of the local computing device against which the one or more expressions of the second entity are to be locally evaluated by transforming the data of the local computing device, and
  - a visualization entity including one or more expressions defining a user interface;
- updating the one or more connected entities in memory based on a remotely computed result of the first entity and a locally computed result of the second entity; and
- presenting at least one of the remotely computed result of the first entity and the locally computed result of the second entity via the user interface defined by the visualization entity;

wherein the description of the plurality of connected entities forms a directed acyclic graph, and wherein independent parts of the business intelligence application are executed in parallel.

14. The one or more computer-readable storage memory of claim 13 wherein the computer process further comprises:
- communicating the one or more expressions of the first entity to the remote data source; and
- receiving the remotely computed result of the first entity from the remote data source.

15. The one or more computer-readable storage memory of claim 13 wherein the computer process further comprises:
- evaluating the one or more expressions of the second entity against the designated local data to yield the locally computed result.

16. The one or more computer-readable storage memory of claim 13 wherein the one or more expressions of the first entity specify a symbolic representation of a computation to be performed on the designated data of the remote data source, wherein each expression is solvable by an expression engine of the remote data source.

17. The one or more computer-readable storage memory of claim 13 wherein the first entity defines an output communicating to an input of another entity of the description, wherein the data value at the output is the remotely computed result.

18. The one or more computer-readable storage memory of claim 13 wherein an input of an entity is formatted to accept an output of another entity.

* * * * *